US010067691B1

(12) United States Patent
Gadelrab et al.

(10) Patent No.: US 10,067,691 B1
(45) Date of Patent: Sep. 4, 2018

(54) SYSTEM AND METHOD FOR DYNAMIC CONTROL OF SHARED MEMORY MANAGEMENT RESOURCES

(71) Applicant: QUALCOMM INCORPORATED, San Diego, CA (US)

(72) Inventors: Serag Gadelrab, Markham (CA); Jason Edward Podaima, Richmond Hill (CA); Kyle Ernewein, Toronto (CA); Meghal Varia, North York (CA)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/448,095

(22) Filed: Mar. 2, 2017

(51) Int. Cl.
| | | |
|---|---|---|
| G06F 3/06 | (2006.01) | |
| G06F 9/50 | (2006.01) | |
| G06F 12/10 | (2016.01) | |
| G06F 12/1009 | (2016.01) | |

(52) U.S. Cl.
CPC .......... G06F 3/0613 (2013.01); G06F 3/0656 (2013.01); G06F 3/0659 (2013.01); G06F 3/0673 (2013.01); G06F 9/5016 (2013.01); G06F 12/1009 (2013.01); G06F 2212/1024 (2013.01)

(58) Field of Classification Search
CPC .... G06F 3/0613; G06F 3/0659; G06F 3/0656; G06F 3/0673; G06F 9/50; G06F 12/1009
See application file for complete search history.

(56) References Cited

U.S. PATENT DOCUMENTS

| | | | |
|---|---|---|---|
| 8,407,432 B2 | 3/2013 | Cai et al. | |
| 2003/0189935 A1* | 10/2003 | Warden | H04L 47/10 370/395.21 |
| 2012/0291042 A1 | 11/2012 | Stubbs et al. | |
| 2013/0290656 A1 | 10/2013 | Staelin et al. | |
| 2014/0223053 A1 | 8/2014 | Yoshida et al. | |
| 2014/0240326 A1 | 8/2014 | Cutter et al. | |
| 2016/0117215 A1 | 4/2016 | Gadelrab et al. | |
| 2016/0127259 A1 | 5/2016 | Duroiu et al. | |
| 2016/0187959 A1 | 6/2016 | Nagarajan et al. | |
| 2016/0350152 A1 | 12/2016 | Gadelrab et al. | |

OTHER PUBLICATIONS

International Search Report for PCT/US2018/018423 filed Feb. 15, 2018; Report dated Apr. 20, 2018; 11pages.

* cited by examiner

*Primary Examiner* — Aracelis Ruiz
(74) *Attorney, Agent, or Firm* — Smith Tempel Blaha LLC/Qualcomm

(57) ABSTRACT

A method and system for dynamic control of shared memory resources within a portable computing device ("PCD") are disclosed. A limit request of an unacceptable deadline miss ("UDM") engine of the portable computing device may be determined with a limit request sensor within the UDM element. Next, a memory management unit modifies a shared memory resource arbitration policy in view of the limit request. By modifying the shared memory resource arbitration policy, the memory management unit may smartly allocate resources to service translation requests separately queued based on having emanated from either a flooding engine or a non-flooding engine.

30 Claims, 9 Drawing Sheets

SYSTEM AND METHOD FOR DYNAMIC CONTROL OF SHARED MEMORY MANAGEMENT RESOURCES

DESCRIPTION OF THE RELATED ART

Portable computing devices ("PCDs") are powerful devices that are becoming necessities for people on personal and professional levels. Examples of PCDs may include cellular telephones, portable digital assistants ("PDAs"), portable game consoles, palmtop computers, and other portable electronic devices.

PCDs typically employ systems-on-chips ("SOCs"). Each SOC may contain multiple processing cores that have deadlines that, if missed, may cause detectable/visible failures that are not acceptable during operation of a PCD. Deadlines for hardware elements, such as cores, are usually driven by amount of bandwidth ("BW") a core receives from shared resources, such as memory or buses, like dynamic random access memory ("DRAM"), Internal static random access memory ("SRAM") memory ("IMEM"), or other memory such as a Peripheral Component Interconnect Express ("PCI-e") external transport links over a short period of time. What is, or is not, a short period of time depends on the particular type of processing core, but is usually in the range of about 10 seconds to about 100 milliseconds.

When certain processing cores do not receive a required memory BW over specified period of time, or experience excessive transaction latency due to overburdened resources in the memory system (such as hardware table walkers), failures that directly and visibly impact user experience may occur. For example, consider a display engine for a PCD: it reads data from a memory element (usually DRAM) and outputs data to a display panel/device for a user to view. If the display engine is not able to read enough data from DRAM within a fixed period of time, then such an issue may cause a display engine to "run out" of application data and be forced to render a fixed, solid color (usually blue or black) on a display due to the lack of display data available to the display engine. This error condition is often referred to in the art as "Display Underflow" or "Display Under Run" or "Display tearing," as understood by one of ordinary skill in the art.

As another example of potential failures when a hardware element does not receive sufficient throughput or bandwidth from a memory element, a camera in a PCD may receive data from a sensor and write that data to the DRAM. If a sufficient amount of data is not written to DRAM within a fixed period of time, then this may cause the camera engine to lose input camera data. Such an error condition is often referred to in the art as "Camera overflow" or "Camera Image corruption," as understood by one of ordinary skill in the art.

Another example for potential failure is a modem core not being able to read/write enough data from/to DRAM over a fixed period to complete critical tasks. If critical tasks are not completed within deadline, modem firmware may crash: voice or data calls of a PCD are lost for period of time or an Internet connection may appear sluggish (i.e.—stuttering during an internet connection).

Accordingly, there is a need in the art for a system and method that dynamically controls access to, and allocation of, shared memory resources. More specifically, there is a need in the art for a system and method that dynamically modifies arbitration policies for shared memory resources such that transactions associated with unacceptable deadline miss ("UDM") engines are prioritized over low priority transactions emanating from "flooder" engines.

SUMMARY OF THE DISCLOSURE

A method and system for dynamic control of shared memory resources within a portable computing device ("PCD") are disclosed. An exemplary embodiment of the solution begins by classifying each of a plurality of traffic engines in the PCD as either a flooding engine or a non-flooding engine. As would be understood by one of ordinary skill in the art, a flooding engine processes workloads that have a relatively high effect on a Quality of Service ("QoS") level relative to workloads processed by a non-flooding engine. Next, for each non-flooding engine, the exemplary embodiment identifies those having an unacceptable deadline miss status. As would be understood by those of ordinary skill in the art, missing a deadline for servicing a translation request emanating from a non-flooding engine having an unacceptable deadline miss status detrimentally impacts QoS.

Translation requests emanating from flooding engines are queued in a flooding engine queue and translation requests emanating from non-flooding engines are queued in a non-flooding engine queue. The flooding engine queue and the non-flooding engine queue are separate queues that, depending on embodiment, may be physically separate and/or logically separate. The method then processes translation requests from flooding engines and translation requests from non-flooding engines according to a default memory resource arbitration policy unless and until one or more limit requests are received from one or more of the non-flooding engines having an unacceptable deadline status. In response to the one or more limit requests, the exemplary method modifies the default memory resource arbitration policy such that there is an increase in allocation of memory resources to translation requests in the non-flooding engine queue.

The one or more limit requests transmitted to the memory manage unit by one or more non-flooding engines processing workloads subject to an unacceptable deadline miss requirement may be based on, inter alia, a FIFO buffer level, an average round trip latency for servicing a translation request, or a workload completion percentage rate. Examples of non-flooding engines having an unacceptable deadline miss status includes, but is not limited to including, a processing core, a display engine, a camera controller, a graphical processing unit, a modem, and software or firmware running on a programmable computing engine.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

Figure 1:
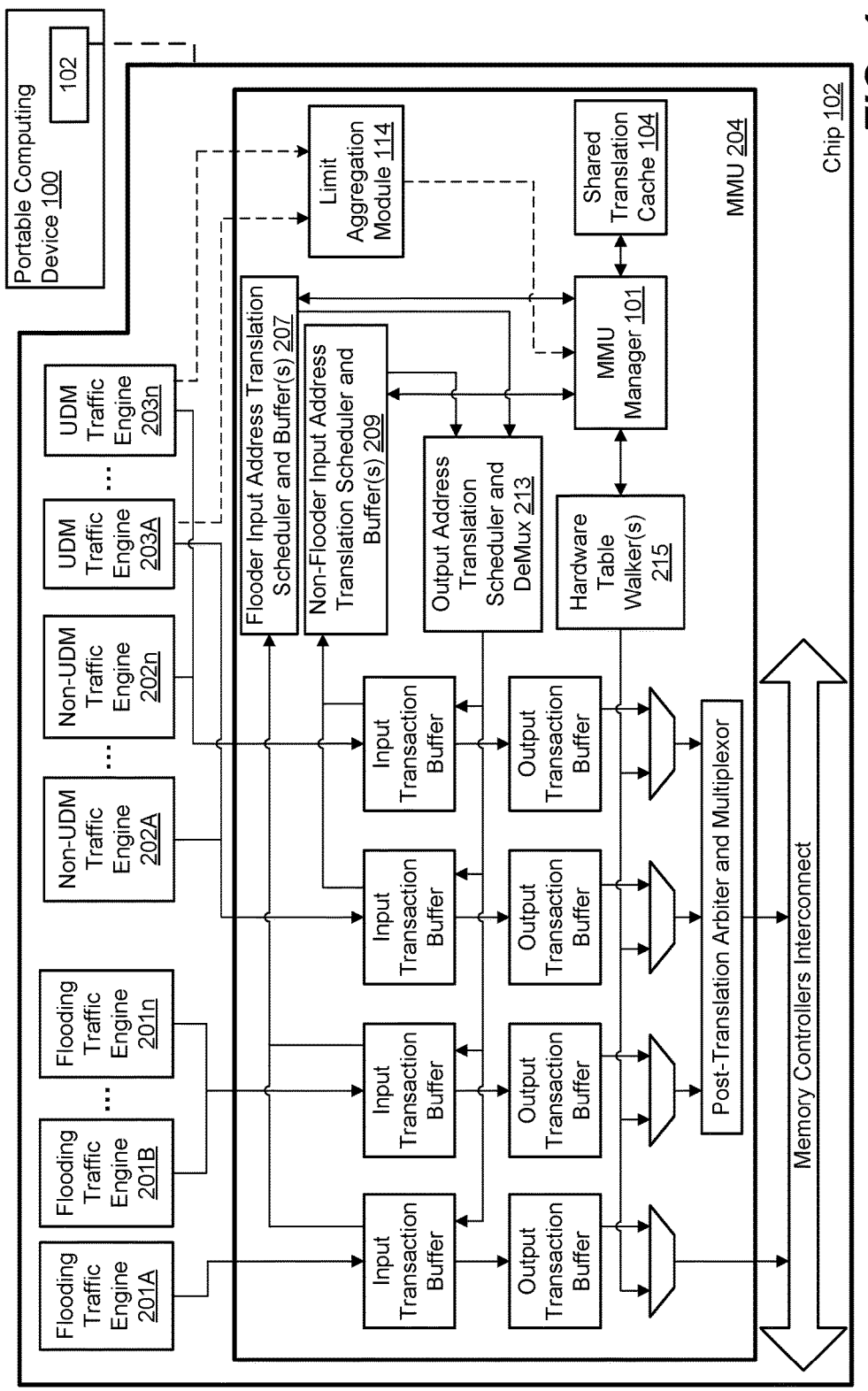
FIG. 1 is a functional block diagram of an exemplary system within a portable computing device ("PCD") for dynamic control of shared memory resources based on danger signals monitored from one or more unacceptable deadline miss ("UDM") elements.

The word "exemplary" is used herein to mean serving as an example, instance, or illustration. Any aspect described herein as "exemplary" is not necessarily to be construed as exclusive, preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

As used in this description, the terms "component," "database," "module," "system," "processing component," "engine," "client" and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "central processing unit ("CPU")," "digital signal processor ("DSP")," and "chip" are used interchangeably. Moreover, a CPU, DSP, or a chip may be comprised of one or more distinct processing components generally referred to herein as "core(s)."

In this description, unacceptable deadline miss ("UDM") elements or engines are those hardware and/or software elements that may cause significant or catastrophic failures of a PCD as described in the background section listed above. Specifically, UDM engines are those elements which may cause exemplary error conditions such as, but not limited to, "Display Underflows," "Display Under runs," "Display tearing," "Camera overflows," "Camera Image corruptions," dropped telephone calls, sluggish Internet connections, etc. as understood by one of ordinary skill in the art. Any hardware and/or software element of a PCD may be characterized and treated as a UDM engine depending on the particular embodiment of the solution.

In this description, the terms "workload," "process load" and "process workload" are used interchangeably and generally directed toward the processing burden, or percentage of processing burden, associated with a given processing component in a given embodiment. Further to that which is defined above, a "processing component" may be, but is not limited to, a central processing unit, a graphical processing unit, a core, a main core, a sub-core, a processing area, a hardware engine, a client, etc. or any component residing within, or external to, an integrated circuit within a portable computing device.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G"), fourth generation ("4G") and fifth generation ("5G") wireless technology have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, a laptop computer with a wireless connection, a notebook computer, an ultrabook computer, a tablet personal computer ("PC"), among others. Notably, however, even though exemplary embodiments of the solutions are described herein within the context of a PCD, the scope of the solutions are not limited to application in PCDs as they are defined above. For instance, the system described herein could be implemented in a typical portable computer, such as a laptop or notebook computer.

Embodiments of the solution configure the memory management unit ("MMU") on a a-priori basis to recognize which one or more of a plurality of clients interfacing with the MMU is characterized as a "flooding" client or potential "aggressor" client and which one or more of the plurality of clients interfacing with the MMU is characterized as a "non-flooding" client or potential "victim" client. Depending on the embodiment of the solution, the MMU may be an aggregated MMU or it may be a distributed MMU. Advantageously, the MMU may leverage separate queuing structures for translation requests emanating from flooding clients versus translation requests emanating from non-flooding clients. It is envisioned that the separate queuing structures may be instantiated in physically separate memory components or may be instantiated in separate areas of a single memory component. Regardless, so long as the queuing structure for translation requests for flooding clients are separate and distinguishable from the queuing structure for non-flooding clients, embodiments of the solution may be able to dynamically control access to, and allocation of, memory resources of the MMU that are shared by both classes of clients. In this way, it is an advantage of the solution that non-flooding clients processing workloads subject to unacceptable deadline misses may be given dynamic priority to shared memory resources over flooding clients such that QoS experienced by a user is optimized.

To optimize QoS, an MMU according to embodiments of the solution may dynamically control the number of hardware table walker components ("HTWs") that are simultaneously occupied with servicing of translation requests associated with flooding clients. As would be understood by one of ordinary skill in the art, an HTW may be leveraged to retrieve data or responses from long-term memory if/when a translation request cannot be serviced from cache—I.e., a "cache miss." In the event of a cache miss, the client from which the translation request emanated has to wait until a HTW is able to search through long-term memory and respond with the "answer" to the translation request. As would be understood by one of ordinary skill in the art, the latency for return of a response from long-term memory is necessarily increased when compared to the low latency for return of a response from cache. Moreover, latency is further increased, sometimes exponentially, if in the event of a cache miss the translation request must be queued until a HTW component becomes available. Such scenarios that increase latency for responses to translation requests may be detrimental, if not fatal, to a non-flooding client working subject to an unacceptable deadline miss ("UDM client" or "UDM engine").

According to embodiments of the solution, victim clients such as UDM clients may be configured to monitor critical failure indicators, such as buffer fill levels, workload completion times, translation request latencies, etc. If a victim client determines from the monitoring of its critical failure indicator(s) that it is nearing a failure point, I.e. it is in danger of experiencing a deadline miss that is unacceptable, it may signal to the MMU to adjust its arbitration policies as applied to flooding clients. That is, the MMU may, among other things, respond to a signal from the victim client by limiting service to known flooder clients. It is envisioned that the limit signal sent by a victim UDM client may be binary in nature or, depending on embodiment, may be a numeric indication of the relative proximity to which the UDM client is to experiencing a failure (e.g., a "higher" signal level indicates that the UDM client is relatively closer to experiencing a failure than when a "lower" signal level is transmitted). Further, depending on the embodiment of the solution, a victim UDM client may continue to transmit a limit request signal to the MMU unless and until it determines that it is no longer in critical danger of experiencing an unacceptable deadline miss.

An MMU according to the solution may combine multiple incoming limit requests from multiple UDM clients into one or more aggregated limit indicators ("ALIs"). In view of the ALI level, the MMU may respond by restricting access of translation requests from one or more flooder clients to hardware page table walkers ("HTWs") by dynamically adjusting the maximum number of HTWs available to those flooders. In doing so, the MMU may "free up" one or more HTWs for servicing of translation requests emanating from UDM clients while translation requests emanating from flooder clients are queued up pending the availability of an HTW eligible for servicing a translation request from a flooder client.

It is envisioned that dynamically adjusting the maximum number of HTWs available for servicing of flooder client requests may include pre-empting any translation from flooder clients already in the process of being serviced by an HTW. In this way, if/when the MMU adjusts the maximum number of HTWs that may be used for service of flooder client translation requests in response to an ALI level, embodiments of the solution may ensure that the newly adjusted maximum number of HTWs is not exceeded due to more than the maximum number of HTWs already being occupied with flooder requests. Simply put, it is envisioned that embodiments of the solution may terminate an ongoing table walk associated with a flooder client request in the event that allowing the table walk to continue would cause the maximum number of HTWs allocable to flooder clients to be exceeded.

It is also envisioned that in some embodiments the level or amount of HTW limitations may be a function of the relative intensity of the ALI level indication (e.g., dependent upon the number of victim UDM clients signaling for flooder limits or the numeric indication for proximity of failure from each victim UDM client). The appropriate amount or level of HTW limitations for flooder client requests in view of a given ALI signal may be determined from a look-up table or, in some embodiments, may be the output of a predefined formula or function, as would be understood by one of ordinary skill in the art.

Notably, the ALI level, which is a direct reflection of the number and/or intensity of limit requests coming from victim UDM clients, may be leveraged by embodiments of the solution to dynamically control or adjust allocation of shared memory management resources, such as HTWs, to servicing translation requests emanating from flooder clients. Advantageously, because translation requests from flooder clients are queued separately from translation requests from non-flooder clients, such as UDM clients, embodiments of the solution may smartly and dynamically allocate shared memory resources in view of the ALI level. The ALI level dictates how the MMU may adjust its arbitration policies for shared memory resources between flooder and non-flooder clients while the separate queuing of translation requests from flooder and non-flooder clients enables the MMU to allocate access according to the adjusted arbitration policies.

Embodiments of the solution may provide for the MMU to revert back to a default policy for shared memory resource allocation, such as a "first in first out" or FIFO policy, if/when the ALI level reaches or nears zero or some other predefined low threshold level.

Referring now to the figures, exemplary embodiments and exemplary aspects of the solution are described in more detail.

FIG. 1 is a functional block diagram of an exemplary system 102 within a portable computing device ("PCD") 100 (See FIG. 8) for dynamic control of shared memory resources 204 based on limit requests monitored from one or more unacceptable deadline miss ("UDM") elements 203.

Each UDM element 203, such as UDM engines 203A-203n, may comprise a limit request module (not illustrated) that produces a limit request signal (depicted with dashed line arrows) that is received and monitored by the limit aggregation module 114. Further details of an exemplary limit request module that produces limit request signals will be described in further detail below in connection with FIG. 2.

Other hardware elements such as Non-UDM engines 202A-n may be part of the PCD 100 and the system 101. The Non-UDM engines 202A-n may not comprise or include limit request modules. Alternatively, in other exemplary embodiments, it is possible for Non-UDM engines 202A-n to have limit request modules, however, such limit request modules of Non-UDM hardware engines 202 are either not coupled to the limit aggregation module 114 or, alternatively, a switch (not illustrated) has turned these limit request modules to an "off" position such that the limit aggregation module 114 does not receive any limit request signals from these designated/assigned Non-UDM hardware engines 202.

Each of Flooding Traffic Engines 201, UDM Traffic Engines 203 and Non-UDM Traffic Engines 202 may be coupled to the Memory Management Unit ("MMU") 204 via one or more interconnects. Similarly, the MMU 204 may be coupled, via an interconnect, to one or more memory controllers (not illustrated) coupled to memory 112 (see FIG. 8). As described above, it is envisioned that the MMU may be an aggregated MMU or a distributed MMU, depending on embodiment. Memory 112 may include, but is not limited to, dynamic random access memory ("DRAM"). An interconnect, as would be understood by one of ordinary skill in the art, may comprise one or more switch fabrics, rings, crossbars, buses etc. Moreover, an interconnect may have additional elements, which are omitted for simplicity, such as controllers, buffers (caches), drivers, repeaters, and receivers, to enable communications. Further, an interconnect may include address, control, and/or data connections to enable appropriate communications among its aforementioned components.

Each UDM engine 203 has a limit request sensor that monitors proximity to failure and produces a limit request signal to the limit aggregation module 114. The limit request signal operates as a request by a given UDM engine 203 for the MMU 204 to adjust its resource arbitration policy to adjust access and/or allocation of MMU resources, such as hardware table walkers ("HTW") 215, for one or more flooding traffic engines 201.

Limit request signals may comprise information indicating levels or degrees at which a UDM engine 203 believes that it is in danger of not meeting a deadline and/or it is in danger of a failure. The failure may comprise one or more error conditions described above in the background section for hardware devices such as, but not limited to, a display engine, a camera, and a modem. As such, each limit request signal may be unique relative to a respective hardware element type. In other words, the limit request signal produced by first UDM core 203A may be different relative to the limit request signal produced by second UDM core 203n. For example, the limit request signal produced by the first UDM core 203A may have a magnitude or scale of five units while the limit request signal produced by the second UDM core 203n may have a magnitude or scale of three units. The differences are not limited to magnitude or scale: other differences may exist for each unique UDM hardware element as understood by one of ordinary skill in the art. Each limit request signal, however, generally corresponds to a time-to-failure or probability of failure value.

The limit aggregation module 114 monitors the limit request signals (dashed line arrows) that are sent to it from the respective UDM engines 203. Based on the limit request signals, the limit aggregation module 114 determines a relative limit request level that it signals to the MMU manager 101 (dashed line arrow from module 114 to module 101). It is envisioned that the limit aggregation module 114 may aggregate all incoming limit requests into one or more aggregated limit indicator ("ALI") signals that are transmitted to the MMU manager 101, as illustrated in FIG. 1 by the dashed line signal arrow from the limit aggregation module 114 to the MMU manager 101.

The MMU manager 101, in view of the ALI signals received from the limit aggregation module 114, dynamically controls assignment of HTW resources 215 for servicing of translation requests. That is, the MMU manager 101 uses the ALI signal(s) to dynamically adjust the maximum allowable number of HTW resources 215 that may be simultaneously allocated to translation requests associated with flooding traffic engines 201. As such, changes in the ALI signal(s) may cause the MMU manager 101 to dynamically adjust the maximum allowable number of HTW resources 215 that may be simultaneously allocated to translation requests associated with flooding traffic engines 201.

In embodiments of the solution, and as can be understood from the exemplary FIG. 1 illustration of system 102, traffic emanating from flooding traffic engines 201 are scheduled and multiplexed ("muxed") separately from traffic emanating from non-flooding clients (e.g, UDM engines 203 and Non-UDM engines 202). In this way, embodiments of the solution ensure that translation requests associated with flooding traffic engines 201 do not cause head-of-line-blocking for translation requests associated with non-flooding engines 202-203. Moreover, although the FIG. 1 illustration depicts a single physical buffer 207 for all translation traffic from all flooder engines 201, it is envisioned that buffer 207 may be comprised of logical buffers and/or may comprise multiple buffers for separation of engines 201 or subgroups of engines 201.

Referring back to the FIG. 1 illustration, translation request traffic emanating from flooding traffic engines 201, Non-UDM engines 202 and UDM engines 203 are directed over busses to certain input transaction buffers uniquely associated with the respective engines 201, 202, 203. Notably, while Non-UDM engines 202 and UDM engines 203 may be associated with a common input transaction buffer (and, by extension, a common output transaction buffer), flooding traffic engines 201 are associated with input and output transaction buffers that are dedicated to flooding traffic engines 201.

All address translation requests from the input buffers are forwarded to translation schedulers and buffers 207, 209. For those translation requests associated with flooding traffic engines 201, the translation requests are pushed to flooder input address translation scheduler and buffers 207. For those translation requests associated with Non-UDM engines 202 and UDM engines 203, the translation requests are pushed to non-flooder input address translation scheduler and buffer(s) 209. For advantageous reasons described above, scheduler and buffer(s) 207 associated with flooder translation requests are physically and/or logically separate from scheduler and buffer(s) 209 associated with non-flooder translation requests.

The MMU manager 101 may coordinate to satisfy address translation requests from modules 207 and 209 by querying the shared translation cache and/or assigning the translation requests to a hardware table walker component 215. The order or priority in which the translation requests are addressed by the MMU manager 101, whether addressed via query of the shared translation cache 104 or allocation to an HTW 215, is determined in view of the ALI signals received from the limit aggregation module 114.

A response to a translation request satisfied from the shared translation cache is supplied by the MMU manager 101 back to the respective scheduler 207, 209 which, in turn, forwards the response back to the appropriate input transaction buffer via the output address translation scheduler and demux module 213. A response from a HTW 215 is forwarded to the MMU manager which then may cache the result in the shared translation cache 104 and provide it to the appropriate input transaction buffer via the output address translation scheduler and demux module 213.

As described above, allocation of shared memory resources, such as HTWs 215, are made by the MMU manager 101 in view of the ALI signal transmitted from the limit aggregation module 114. Depending on the ALI signal, the MMU manager 101 may adjust the number of HTWs 215 that are eligible to respond to a translation request associated with a flooder engine 201. Depending on embodiment, adjusting the number of HTWs 215 that are eligible to respond to a translation request associated with a flooder engine 201 may comprise terminating an ongoing page walk so that an otherwise occupied HTW 215 becomes available and earmarked for translation requests associated with a non-flooder engine such as a UDM engine. Further depending on embodiment, adjusting the number of HTWs 215 that are eligible to respond to a translation request associated with a flooder engine 201 may comprise deprioritizing translation requests associated with a certain one or more flooder engines 201 that are associated with a certain one or more UDM engines 203 making limit requests (e.g., a display may cause throttling to a GPU and DSP but not a CPU). Also, and as described previously, the number of HTWs 215 that an MMU manager 101 earmarks for non-flooder clients versus flooder clients may be a function of the ALI signal generated by the limit aggregation module 114. In this way, the ALI may be weighted depending on the particular UDM engine 203 sending a limit request to the limit aggregation module 114. Moreover, depending on embodiment, there may be one or more ALI signals from the module 114 to the MMU manager 101 per group of flooder engines 201. Each ALI signal may have a value assigned to it as a function of the number and intensity of active limit requests transmitted from the associated UDM cores 203 to the module 114.

It is further envisioned that the ALI signal from the limit aggregation module 114 may be used by some embodiments of the solution as a threshold to prevent allocation of flooder engine 201 translations into the shared cache, thereby mitigating or preventing flooder clients 201 from overwriting translations for non-flooder clients 202, 203 that may be nearing failure.

Figure 2:
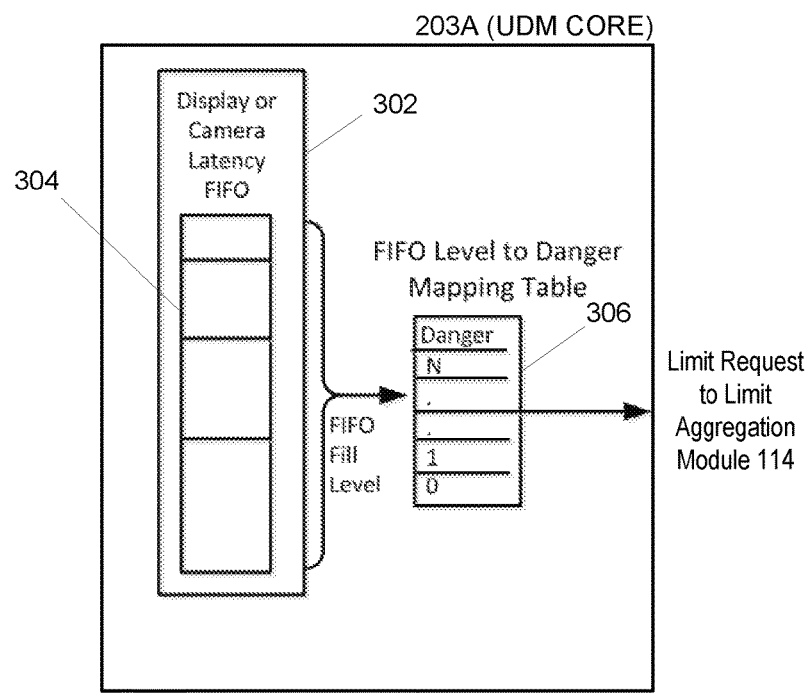
FIG. 2 is a functional block diagram of an exemplary limit request sensor for an unacceptable deadline miss ("UDM") traffic engine, such as a core of a multicore processor.

Referring now to FIG. 2, this figure is a functional block diagram of an exemplary limit request sensor for an unacceptable deadline miss ("UDM") traffic engine 203A, such as a display core for example. The limit request sensor operates to detect a UDM traffic engine 203 proximity to failure. The limit request sensor may comprise a first-in, first-out (FIFO) data buffer 302 and a FIFO level danger mapping table 306. Each FIFO data buffer 302 may comprise a set of read and write pointers, storage and control logic. Storage may be static random access memory ("SRAM"), flip-flops, latches or any other suitable form of storage.

According to one exemplary embodiment, each FIFO data buffer 302 may track data that is received by the UDM traffic engine 203A. For example, suppose that the UDM traffic engine 203A comprises a display engine. The display engine 203A or a display controller 128 (see FIG. 8) would read from DRAM memory 112 display data that would be stored in the FIFO data buffer 302. The display engine 203A (or display controller 128 of FIG. 8) would then take the display data from the FIFO dater buffer 302 and send it to a display or touchscreen 132 (see FIG. 8).

The FIFO data buffer 302 has a fill level 304 which may be tracked with a danger mapping table 306. As the fill level 304 for the FIFO data buffer 302 decreases in value, the limit request tracked by the danger mapping table 306 would increase because if the FIFO data buffer 302 becomes empty or does not have any data to send to the display or touchscreen 132, then the error conditions described above as the "Display Underflow" or "Display Under run" or "Display tearing," may occur. The output of the danger mapping table 306 is the limit request signal that is sent to the limit aggregation module 114 as described above.

According to another exemplary embodiment, suppose the UDM traffic engine 203A of FIG. 2 comprises a camera controller. The camera controller (not illustrated) within the SoC 102 reads data from the camera sensor 148 (See FIG. 8) and stores it within the FIFO data buffer 302. The camera controller then outputs the camera data from the FIFO data buffer 302 to DRAM memory 112. In this example embodiment, if the FIFO data buffer 302 overflows from the camera data, then some camera data may be lost and the error conditions of "Camera overflow" or "Camera Image corruption," may occur. So according to this exemplary embodiment, as the FIFO fill level 304 increases, then the limit request output signal also increases. This limit request of the camera sensor 148 is opposite to the limit request display embodiment described previously.

Figure 8:
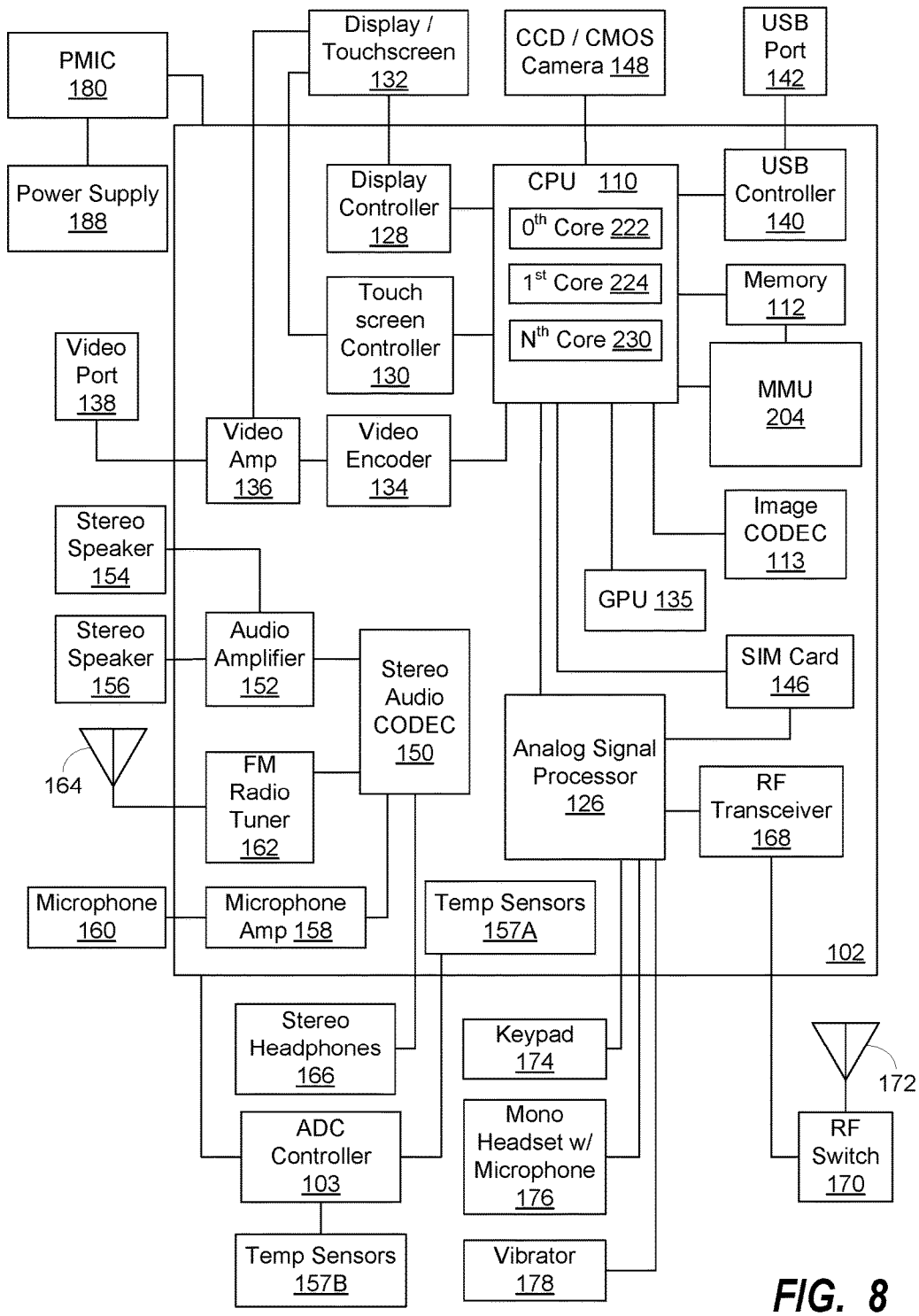
FIG. 8 is a functional block diagram of an exemplary, non-limiting aspect of a PCD in the form of a wireless telephone for implementing methods and systems for dynamic control of shared memory resources.

According to another exemplary embodiment, suppose the UDM traffic engine 203A of FIG. 2 comprises a modem or analog signal processor 126 (see FIG. 8) or a graphical processing unit ("GPU") 182 (see FIG. 8). According to such embodiments, the UDM traffic engine 203A may monitor the round-trip latency of all its transactions which are sent to the DRAM memory 112. The UDM traffic engine 203A may calculate an average and/or peak round-trip DRAM latency over a fixed or a sliding time window. A limit request signal output may be generated in proportion to the average and/or peak latency observed by the UDM traffic engine 203A: for low latency transactions the limit request may be characterized as "low," while for transactions in which latency increases, the limit request may be characterized as "high."

According to other exemplary embodiments, the UDM traffic engine 203A of FIG. 2 and its respective limit request sensor may comprise a software-based deadline projection module (not illustrated in FIG. 2). The software may be executed by a CPU 110 or a digital signal processor. Alternatively, the UDM traffic engine 203A may comprise firmware running on a programmable computing engine that continuously tracks the completion of tasks as well as fraction of tasks already completed and elapsed time since each task was commenced by UDM traffic engine 203A. The software and/or firmware of the UDM traffic engine 203A may estimate the completion time for task and compares that completion time to a target or maximum deadline to complete one or more tasks as specified by a user and/or an application program.

According to this firmware/software exemplary embodiment for the UDM traffic engine 203A, the limit request signal output is determined and generated based on a look-up-table or a formula that uses one or more variables as input. Those one or more variables may include, but are not limited to, elapsed time, fraction of completed task, maximum deadline completion time, and/or concurrent total load on the computing engine.

According to another exemplary embodiment, the UDM traffic engine 203A may comprise a hardware element that has a deadline projection mechanism. For example, such a UDM traffic engine 203A may comprise a video encoder 134 (see FIG. 8) or a video codec. The video encoder 134 or video codec may comprise a fixed function computing engine that may continuously check fractions of tasks already completed as well as elapsed times since individual tasks have started. Such dedicated hardware may estimate completion time for each task in compared to a maximum deadline completion time that may be specified by a user and/or an application program. A video codec may comprise hardware that logs a percentage of video frames that are encoded or decoded any given time.

The limit request signal output for such a video oriented UDM traffic engine 203A would be determined and generated based on a table or formula that may use, but is not limited to using, one or more of the following variables as input: elapsed time, fraction of completed task, maximum deadline for completion time, and the concurrent load on the fixed function engine.

Figure 3:
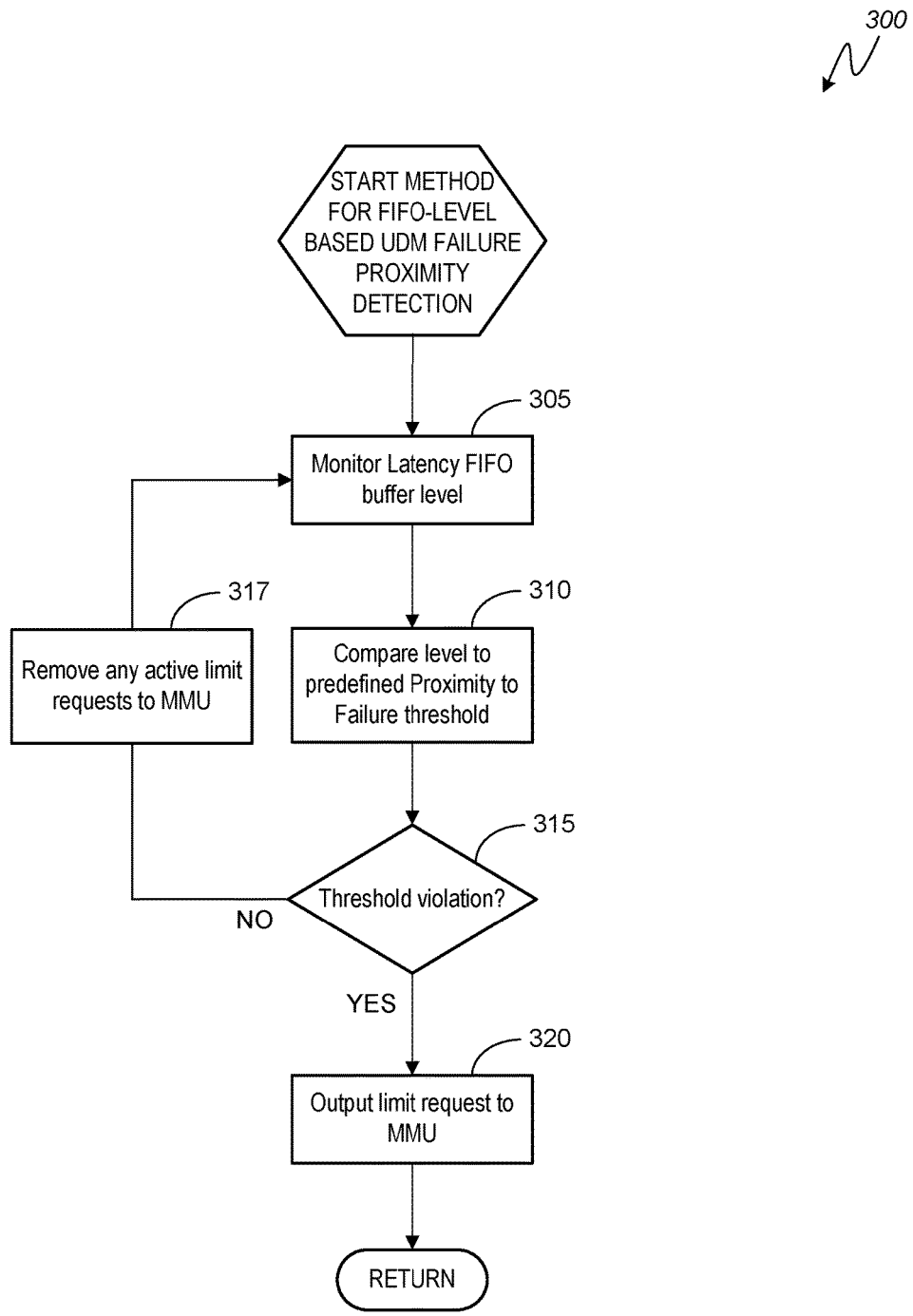
FIG. 3 is a logical flowchart illustrating in more detail the exemplary method for FIFO-level based failure proximity detection described relative to the FIG. 2 limit request sensor.

FIG. 3 is a logical flowchart illustrating in more detail the exemplary method 300 for FIFO-level based failure proximity detection described relative to the FIG. 2 limit request sensor. A limit request sensor configured for FIFO-level based failure proximity detection may be comprised within a UDM traffic engine 203A such as, but not limited to, a display engine or a camera engine.

Beginning with block 305, a latency FIFO buffer level may be monitored. At block 310, the monitored level in the FIFO buffer may be compared to a predefined proximity to failure threshold. If the UDM traffic engine comprising the limit request sensor is a display engine, for example, the predefined proximity to failure threshold may be a low threshold that, if reached, indicates that the FIFO buffer is nearing empty (thereby risking that there will be no data available for rendering on the display panel). As such, for a UDM traffic engine 203A in the form of a display engine, the proximity to failure level monitored by the sensor at block 305 increases as the FIFO fill level decreases. By contrast, if the UDM traffic engine comprising the limit request sensor is a camera engine, for example, the predefined proximity to failure threshold may be a high threshold that, if reached, indicates that the FIFO buffer is nearing full (thereby risking that camera data may be lost before being written to the DRAM 112). As such, for a UDM traffic engine 203A in the form of a camera engine, the proximity to failure level monitored by the sensor at block 305 increases as the FIFO fill level increases.

Returning to the method 300, at decision block 315 the method determines whether there has been a violation of the predefined proximity to failure threshold. If not, then the "NO" branch is followed to block 317 and the output limit request to the MMU is removed before the method 300 loops back to block 305 and the limit request sensor associated with the UDM engine 203A continues to monitor the FIFO level. If the predefined proximity to failure threshold has been violated, then the "YES" branch is followed to block 320 and a limit request for flooders is output to the limit aggregation module 114 of the MMU 204.

Figure 4:
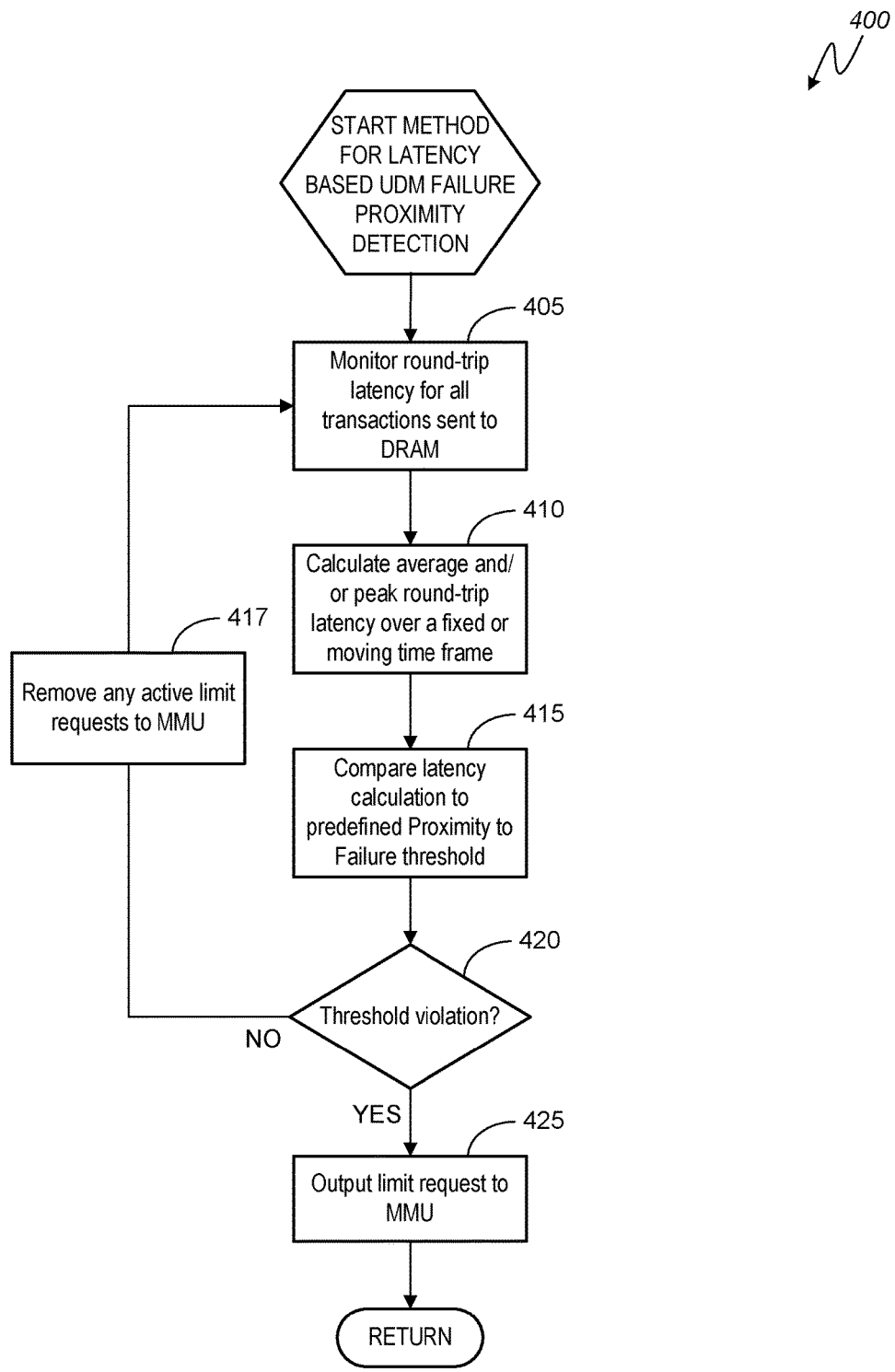
FIG. 4 is a logical flowchart illustrating in more detail the exemplary method for latency based failure proximity detection described relative to the FIG. 2 limit request sensor.

FIG. 4 is a logical flowchart illustrating in more detail the exemplary method 400 for latency based failure proximity detection described relative to the FIG. 2 limit request sensor. A limit request sensor configured for latency based failure proximity detection may be comprised within a UDM traffic engine 203A such as, but not limited to, a modem or a graphical processing unit ("GPU").

Beginning with block 405, a latency calculation may be monitored. The average and/or peak round trip latency of transactions emanating from the UDM traffic engine 203A over a predefined time window may be monitored. At blocks 410 and 415, the average and/or peak latency may be calculated and compared to a predefined proximity to failure threshold. The predefined proximity to failure threshold may be set relatively high, as a low average and/or peak latency calculation would indicate a low or non-existent risk of failure. By contrast, the higher the average and/or peak latency calculation, the higher the risk of failure by the UDM engine 203A to meet its QoS demands.

Returning to the method 400, at decision block 420 the method determines whether there has been a violation of the predefined proximity to failure threshold. If not, then the "NO" branch is followed to block 417 and the output limit request to the MMU is removed before the method 400 loops back to block 405 and the limit request sensor associated with the UDM engine 203A continues to monitor the round trip latencies of requests. If the predefined proximity to failure threshold has been violated, then the "YES" branch is followed to block 425 and a limit request for flooders is output to the limit aggregation module 114 of the MMU 204.

Figure 5:
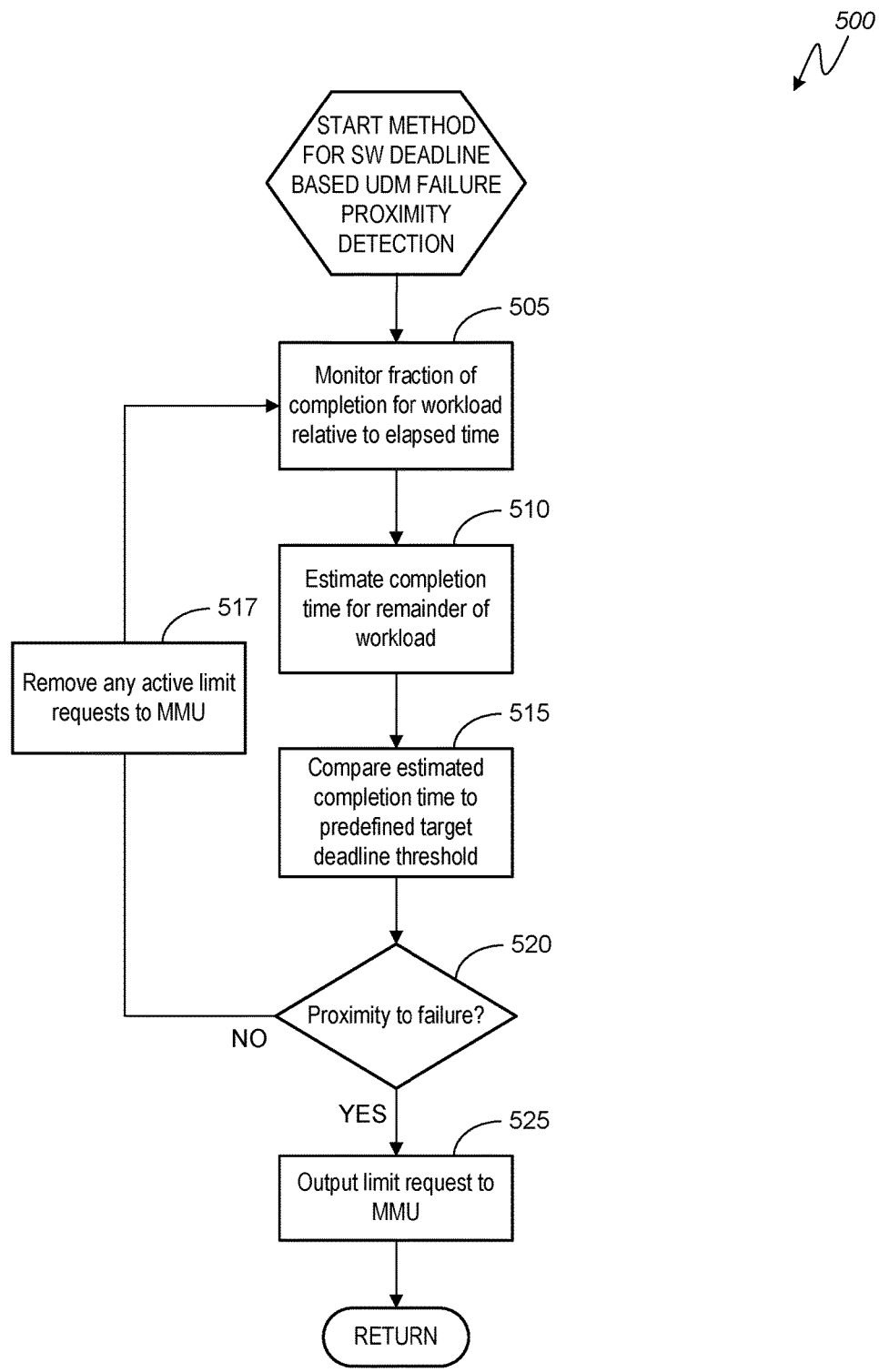
FIG. 5 is a logical flowchart illustrating in more detail the exemplary method for software deadline based failure proximity detection described relative to the FIG. 2 limit request sensor.

FIG. 5 is a logical flowchart illustrating in more detail the exemplary method 500 for software deadline based failure proximity detection described relative to the FIG. 2 limit request sensor. A limit request sensor configured for software deadline based failure proximity detection may be comprised within a UDM traffic engine 203A such as, but not limited to, a central processing unit ("CPU") or a digital signal processor ("DSP").

Beginning with block 505, a workload completion percentage rate may be monitored. At blocks 510 and 515, the time for completion of the remainder of the workload not yet processed may be estimated and compared to a predefined proximity to failure threshold. The predefined proximity to failure threshold may be set according to a target or maximum deadline to complete a workload. Therefore, the higher the workload completion percentage rate calculation, the more likely that the remainder of the workload will be completed before the deadline and, as such, the lower the risk of failure by the UDM engine 203A to meet its QoS demands.

Returning to the method 500, at decision block 520 the method determines whether there has been a violation of the predefined proximity to failure threshold. If not, then the "NO" branch is followed to block 517 and the output limit request to the MMU is removed before the method 500 loops back to block 505 and the limit request sensor associated with the UDM engine 203A continues to monitor the fraction of completion for the workload relative to an elapsed amount of time since the UDM engine 203A began processing the workload. If the predefined proximity to failure threshold has been violated, then the "YES" branch is followed to block 525 and a limit request for flooders is output to the limit aggregation module 114 of the MMU 204. It is envisioned that, depending on the percentage of workload that has been processed over a given period of time, the magnitude of the limit request sent to the limit aggregation module 114 may vary.

Figure 6:
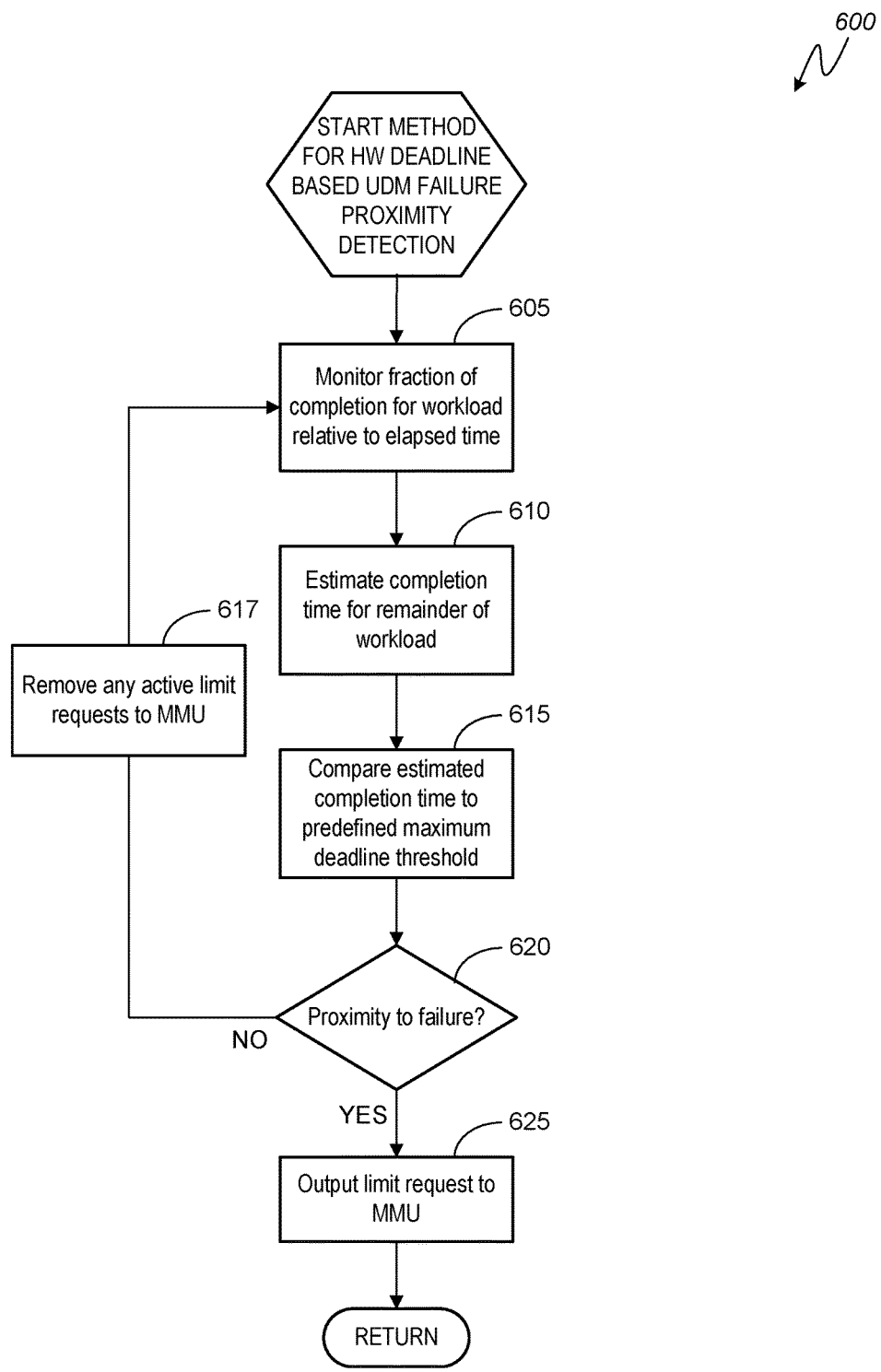
FIG. 6 is a logical flowchart illustrating in more detail the exemplary method for hardware deadline based failure proximity detection described relative to the FIG. 2 limit request sensor.

FIG. 6 is a logical flowchart illustrating in more detail the exemplary method 600 for hardware deadline based failure proximity detection described relative to the FIG. 2 limit request sensor. A limit request sensor configured for hardware deadline based failure proximity detection may be comprised within a UDM traffic engine 203A such as, but not limited to, a video codec, an image signal processor, or a "fixed function" engine.

Beginning with block 605, an estimated workload completion time may be monitored via dedicated hardware, the arrangement of which would be understood by one of ordinary skill in the art. For example, if the UDM traffic engine 203A was in the form of a video codec, the dedicated hardware may be comprised within the video codec and configured to log the percentage of a frame that has been encoded or decoded at a given point in time. At blocks 610 and 615, the time for completion of the remainder of the workload not yet processed may be estimated and compared to a predefined proximity to failure threshold. The proximity to failure level may be defined, determined and signaled based on a table or formula that considers variables such as, but not limited to, elapsed time, fraction of task completed, maximum deadline for full completion of task, and concurrent workload on the fixed function UDM engine 203A.

Returning to the method 600, at decision block 620 the method determines whether there has been a violation of the predefined proximity to failure threshold. If not, then the "NO" branch is followed to block 617 and the output limit request to the MMU is removed before the method 600 loops back to block 605 and the limit request sensor associated with the UDM engine 203A continues to monitor the fraction of completion for the workload relative to an elapsed amount of time since the UDM engine 203A began processing the workload. If the predefined proximity to failure threshold has been violated, then the "YES" branch is followed to block 625 and a limit request for flooders is output to the limit aggregation module 114 of the MMU 204. It is envisioned that, depending on the percentage of workload that has been processed over a given period of time, the magnitude of the limit request sent to the limit aggregation module 114 may vary.

Figure 7:
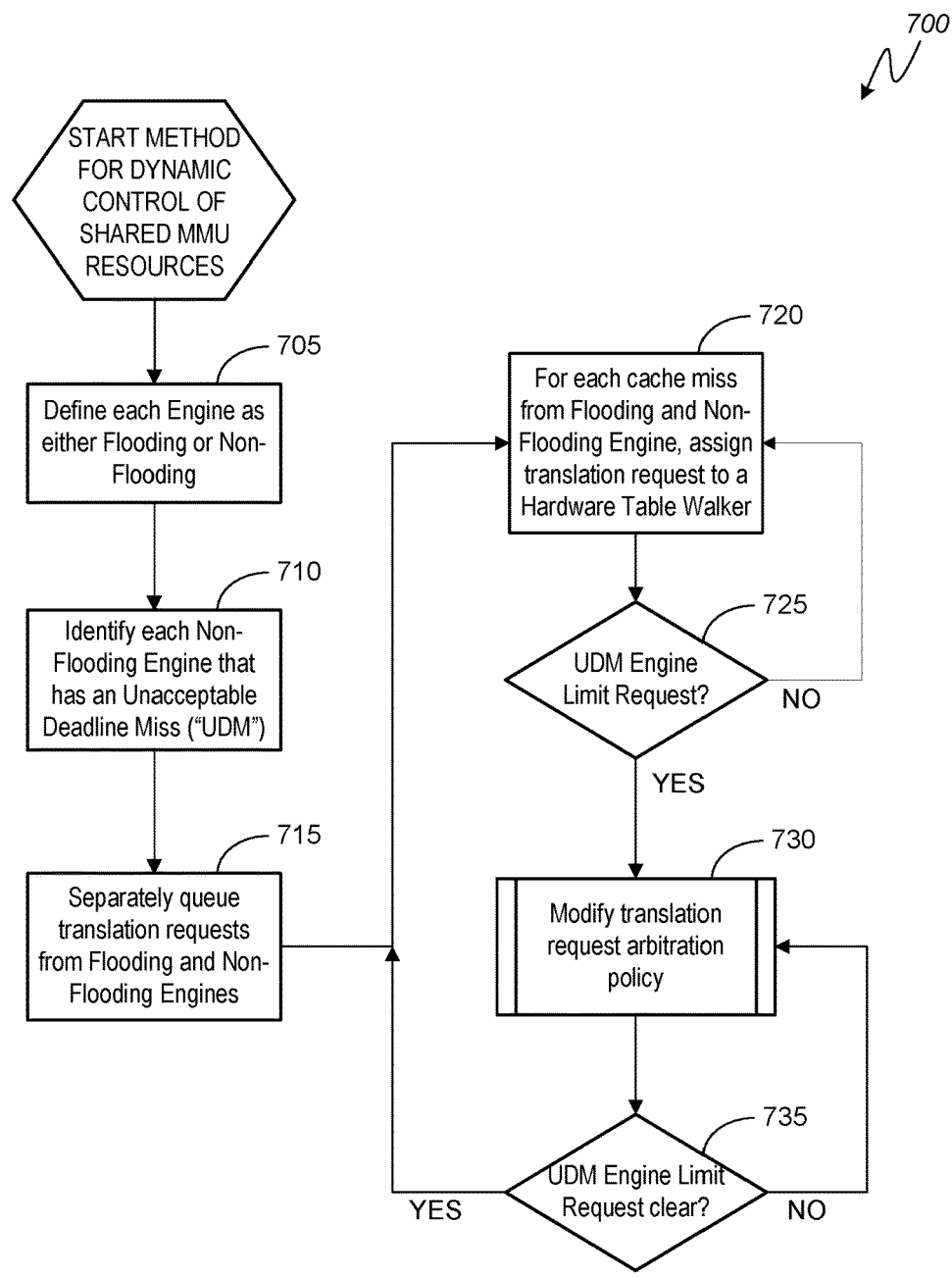
FIG. 7 is a logical flowchart illustrating an exemplary method for dynamic control of shared memory resources.

FIG. 7 is a logical flowchart illustrating an exemplary method 700 for dynamic control of shared memory resources. Beginning at block 705, each traffic engine with access to the shared memory resource may be defined or classified as either a flooding engine or a non-flooding engine. UDM engines 203 may be classified as non-flooding engines at block 710. Next, at block 715, translation requests emanating from flooding engines may be separately queued from translation requests emanating from non-flooding engines. The method 700 then proceeds to block 720.

At block 720, for each cache miss from flooding engines 201 and non-flooding engines 202, 203 the method 700 may assign a shared memory resource, such as a hardware table walker ("HTW"), to respond to the translation request. At block 720, the method 700 may be allocating the shared memory resources according to a default allocation policy without regard for the classification of the engine from which a given translation request emanated. The method 700 continues to decision block 725 to determine if a UDM engine(s) 203 has issued a limit request for the MMU 204 to limit access for flooder engines 201 to memory resources.

If no UDM engine 203 limit requests have been received, the "NO" branch may be followed from decision block 725 and the method 700 may continue to allocate shared memory resources according to a default allocation policy. If, however, one or more limit requests have been received by the MMU 204, the "YES" branch may be followed from decision block 725 to process block 730. At process block 730, the method 700 may modify the translation request arbitration policy according to one or more factors previously described such that one or more shared memory resources, such as HTWs, are freed up for servicing UDM engine 203 translation requests. The method continues to decision block 735 and, if the UDM engine 203 limit requests are cleared (I.e., no UDM engine 203 is in danger of failure), the method loops back to block 720 where the default arbitration policy is resumed. Otherwise the method 700 follows the "NO" branch from decision block 735 back to process block 730 where arbitration of shared memory resources is dynamically adjusted to ensure that translation requests emanating from UDM engines 203 are timely serviced.

Referring now to FIG. 8, this figure is a functional block diagram of an exemplary, non-limiting aspect of a PCD 100 in the form of a wireless telephone for implementing methods and systems for dynamic control of shared memory resources. As shown, the PCD 100 includes an on-chip system 102 that includes a multi-core central processing unit ("CPU") 110 and an analog signal processor 126 that are coupled together. The CPU 110 may comprise a zeroth core 222, a first core 224, and an Nth core 230 as understood by one of ordinary skill in the art. Further, instead of a CPU 110, a digital signal processor ("DSP") may also be employed as understood by one of ordinary skill.

In general, memory management unit 204 may be formed from hardware and/or firmware and may be responsible for dynamically controlling allocation of shared memory resources among and between flooding engines and non-flooding engines. As illustrated in FIG. 8, a display controller 128 and a touch screen controller 130 are coupled to the digital signal processor 110. A touch screen display 132 external to the on-chip system 102 is coupled to the display controller 128 and the touch screen controller 130. PCD 100 may further include a video encoder 134, e.g., a phase-alternating line ("PAL") encoder, a sequential couleur avec memoire ("SECAM") encoder, a national television system(s) committee ("NTSC") encoder or any other type of video encoder 134. The video encoder 134 is coupled to the multi-core CPU 110. A video amplifier 136 is coupled to the video encoder 134 and the touch screen display 132. A video port 138 is coupled to the video amplifier 136. As depicted in FIG. 8, a universal serial bus ("USB") controller 140 is coupled to the CPU 110. Also, a USB port 142 is coupled to the USB controller 140.

A memory 112, which may include a PoP memory, a cache, a mask ROM/Boot ROM, a boot OTP memory, a type DDR of DRAM memory may also be coupled to the CPU 110. A subscriber identity module ("SIM") card 146 may also be coupled to the CPU 110. Further, as shown in FIG. 8, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 8, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 8 shows that a microphone amplifier 158 may be also coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 8 further indicates that a radio frequency ("RF") transceiver 168 may be coupled to the analog signal processor 126. An RF switch 170 may be coupled to the RF transceiver 168 and an RF antenna 172. As shown in FIG. 8, a keypad 174 may be coupled to the analog signal processor 126. Also, a mono headset with a microphone 176 may be coupled to the analog signal processor 126. Further, a vibrator device 178 may be coupled to the analog signal processor 126. FIG. 8 also shows that a power supply 188, for example a battery, is coupled to the on-chip system 102 through a power management integrated circuit ("PMIC") 180. In a particular aspect, the power supply 188 includes a rechargeable DC battery or a DC power supply that is derived from an alternating current ("AC") to DC transformer that is connected to an AC power source.

The CPU 110 may also be coupled to one or more internal, on-chip thermal sensors 157A as well as one or more external, off-chip thermal sensors 157B. The on-chip thermal sensors 157A may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 157B may comprise one or more thermistors. The thermal sensors 157 may produce a voltage drop that is converted to digital signals with an analog-to-digital converter ("ADC") controller (not shown). However, other types of thermal sensors 157 may be employed.

The touch screen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, thermal sensors 157B, the PMIC 180 and the power supply 188 are external to the on-chip system 102. It will be understood, however, that one or more of these devices depicted as external to the on-chip system 102 in the exemplary embodiment of a PCD 100 in FIG. 14 may reside on chip 102 in other exemplary embodiments.

In a particular aspect, one or more of the method steps described herein may be implemented by executable instructions and parameters stored in the memory 112 or as form the MMU 204. Further, the MMU 204, the memory 112, the instructions stored therein, or a combination thereof may serve as a means for performing one or more of the method steps described herein.

Figure 9:
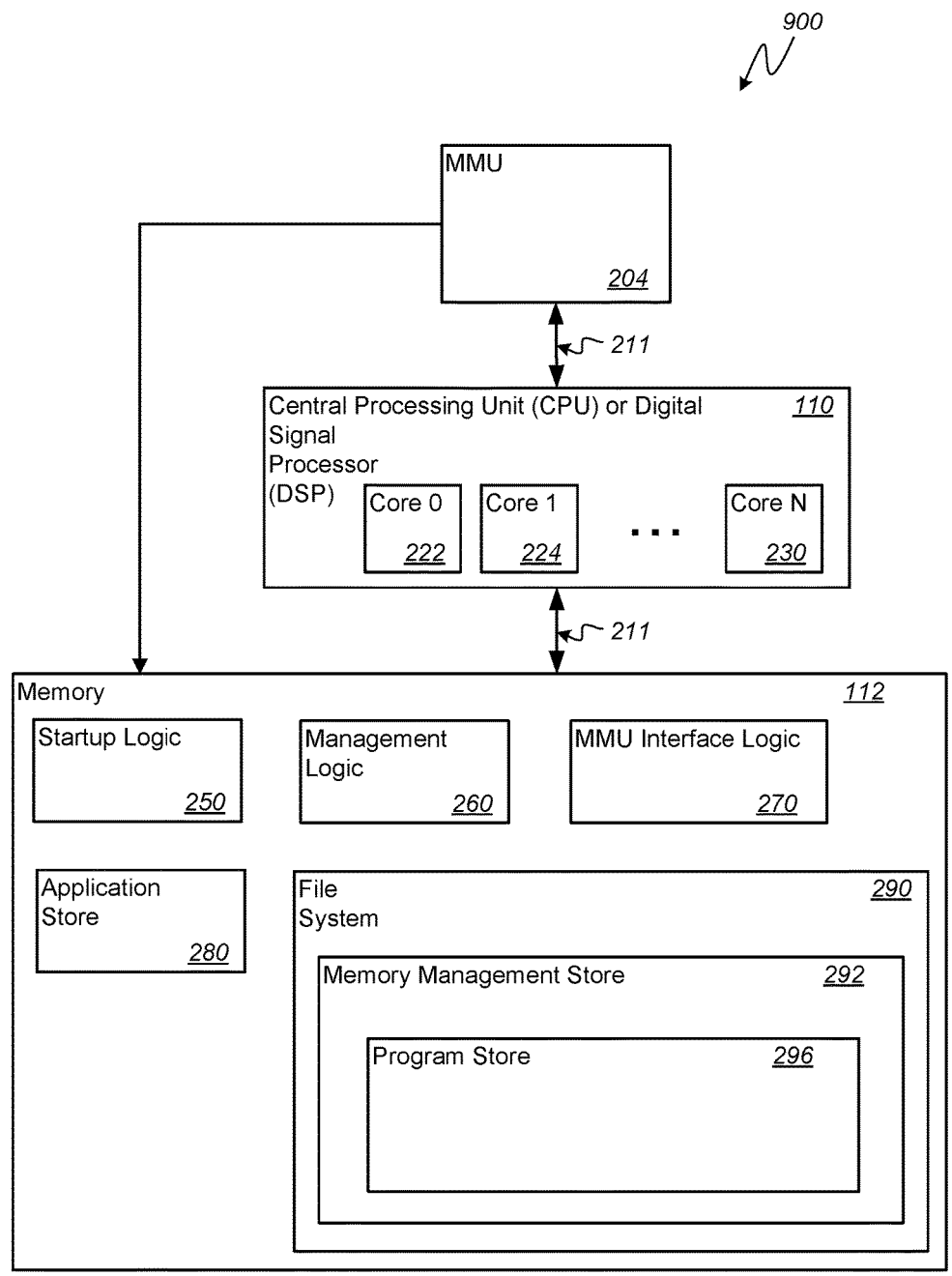
FIG. 9 is a schematic diagram illustrating an exemplary software architecture of the PCD of FIG. 8 for executing methodologies for dynamic control of shared memory resources.

FIG. 9 is a schematic diagram illustrating an exemplary software architecture of the PCD of FIG. 8 for executing methodologies for dynamic control of shared memory resources. As illustrated in FIG. 9, the CPU or digital signal processor 110 is coupled to the memory 112 via MMU 204 and main bus 211. The CPU 110, as noted above, is a multiple-core processor having N core processors. That is, the CPU 110 includes a first core 222, a second core 224, and an $N^{th}$ core 230. As is known to one of ordinary skill in the art, each of the first core 222, the second core 224 and the $N^{th}$ core 230 are available for supporting a dedicated application or program. Alternatively, one or more applications or programs may be distributed for processing across two or more of the available cores.

The CPU 110 may receive commands from the MMU 204 that may comprise software and/or hardware. If embodied as software, the MMU 204 comprises instructions that are executed by the CPU 110 that issues commands to other application programs being executed by the CPU 110 and other processors.

The first core 222, the second core 224 through to the Nth core 230 of the CPU 110 may be integrated on a single integrated circuit die, or they may be integrated or coupled on separate dies in a multiple-circuit package. Designers may couple the first core 222, the second core 224 through to the $N^{th}$ core 230 via one or more shared caches and they may implement message or instruction passing via network topologies such as bus, ring, mesh and crossbar topologies.

Bus 211 may include multiple communication paths via one or more wired or wireless connections, as is known in the art and described above in the definitions. The bus 211 may have additional elements, which are omitted for simplicity, such as controllers, buffers (caches), drivers, repeaters, and receivers, to enable communications. Further, the bus 211 may include address, control, and/or data connections to enable appropriate communications among the aforementioned components.

When the logic used by the PCD 100 is implemented in software, as is shown in FIG. 9, it should be noted that one or more of startup logic 250, management logic 260, MMU interface logic 270, applications in application store 280 and portions of the file system 290 may be stored on any computer-readable medium for use by, or in connection with, any computer-related system or method.

In the context of this document, a computer-readable medium is an electronic, magnetic, optical, or other physical device or means that may contain or store a computer program and data for use by or in connection with a computer-related system or method. The various logic elements and data stores may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random-access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, for instance via optical scanning of the paper or other medium, then compiled, interpreted or otherwise processed in a suitable manner if necessary, and then stored in a computer memory.

In an alternative embodiment, where one or more of the startup logic 250, management logic 260 and perhaps the MMU interface logic 270 are implemented in hardware, the various logic may be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The memory 112 is a non-volatile data storage device such as a flash memory or a solid-state memory device. Although depicted as a single device, the memory 112 may be a distributed memory device with separate data stores coupled to the digital signal processor 110 (or additional processor cores).

The startup logic 250 includes one or more executable instructions for selectively identifying, loading, and executing a select program for dynamic control of shared memory resources. The startup logic 250 may identify, load and execute a select program. An exemplary select program may be found in the program store 296 of the embedded file system 290. The exemplary select program, when executed by one or more of the core processors in the CPU 110 may operate in accordance with one or more signals provided by the MMU 204 to implement methodologies for dynamic control of shared memory resources.

The management logic 260 includes one or more executable instructions for terminating a program on one or more of the respective processor cores, as well as selectively identifying, loading, and executing a more suitable replacement program. The management logic 260 is arranged to perform these functions at run time or while the PCD 100 is powered and in use by an operator of the device. A replacement program may be found in the program store 296 of the embedded file system 290.

The interface logic 270 includes one or more executable instructions for presenting, managing and interacting with external inputs to observe, configure, or otherwise update information stored in the embedded file system 290. In one embodiment, the interface logic 270 may operate in conjunction with manufacturer inputs received via the USB port 142. These inputs may include one or more programs to be deleted from or added to the program store 296. Alternatively, the inputs may include edits or changes to one or more of the programs in the program store 296. Moreover, the inputs may identify one or more changes to, or entire replacements of one or both of the startup logic 250 and the management logic 260. By way of example, the inputs may include a change to a given proximity to failure threshold for a certain type of engine designated as a UDM engine.

The interface logic 270 enables a manufacturer to controllably configure and adjust an end user's experience under defined operating conditions on the PCD 100. When the memory 112 is a flash memory, one or more of the startup logic 250, the management logic 260, the interface logic 270, the application programs in the application store 280 or information in the embedded file system 290 may be edited, replaced, or otherwise modified. In some embodiments, the interface logic 270 may permit an end user or operator of the PCD 100 to search, locate, modify or replace the startup logic 250, the management logic 260, applications in the application store 280 and information in the embedded file system 290. The operator may use the resulting interface to make changes that will be implemented upon the next startup of the PCD 100. Alternatively, the operator may use the resulting interface to make changes that are implemented during run time.

The embedded file system 290 includes a hierarchically arranged memory management store 292. In this regard, the file system 290 may include a reserved section of its total file system capacity for the storage of information for the configuration and management of the various memory management and resource arbitration algorithms used by the PCD 100.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", "subsequently", etc. are not intended to limit the order of the steps. These words are simply used to guide the reader through the description of the exemplary method.

The various operations and/or methods described above may be performed by various hardware and/or software component(s) and/or module(s), and such component(s) and/or module(s) may provide the means to perform such operations and/or methods. Generally, where there are methods illustrated in Figures having corresponding counterpart means-plus-function Figures, the operation blocks correspond to means-plus-function blocks with similar numbering. For example, blocks 805 through 845 illustrated in FIG. 8 correspond to means-plus-functions that may be recited in the claims.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the drawings, which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

The methods or systems, or portions of the system and methods, may be implemented in hardware or software. If implemented in hardware, the devices can include any, or a combination of, the following technologies, which are all well known in the art: discrete electronic components, an integrated circuit, an application-specific integrated circuit having appropriately configured semiconductor devices and resistive elements, etc. Any of these hardware devices, whether acting or alone, with other devices, or other components such as a memory may also form or comprise components or means for performing various operations or steps of the disclosed methods.

The software and data used in representing various elements can be stored in a memory and executed by a suitable instruction execution system (microprocessor). The software may comprise an ordered listing of executable instructions for implementing logical functions, and can be embodied in any "processor-readable medium" for use by or in connection with an instruction execution system, apparatus, or device, such as a single or multiple-core processor or processor-containing system. Such systems will generally access the instructions from the instruction execution system, apparatus, or device and execute the instructions.

Therefore, although selected aspects have been illustrated and described in detail, it will be understood that various substitutions and alterations may be made therein without departing from the spirit and scope of the present invention, as defined by the following claims.

What is claimed is:

1. A method for dynamic control of shared memory resources within a portable computing device, the method comprising:
classifying each of a plurality of traffic engines as either a flooding engine or a non-flooding engine, wherein a flooding engine processes workloads that are capable of generating bursts of high bandwidths within short periods of times at low priorities in Quality of Service ("QoS") schemes relative to workloads processed by a non-flooding engine;
for each non-flooding engine, identifying those having an unacceptable deadline miss status, wherein missing a deadline for servicing a translation request emanating from a non-flooding engine having an unacceptable deadline miss status detrimentally impacts QoS and produces user-noticeable degradation in device performance;
queuing translation requests from flooding engines in a flooding engine queue and translation requests from non-flooding engines in a non-flooding engine queue, wherein the flooding engine queue and the non-flooding engine queue are separate;
processing translation requests from flooding engines and translation requests from non-flooding engines according to a default memory resource arbitration policy;
receiving one or more limit requests from one or more of the non-flooding engines having an unacceptable deadline status; and
based on the one or more limit requests, modifying the default arbitration policy for memory address translation resource such that there is an increase in allocation of memory address translation resources to translation requests in the non-flooding engine queue.

2. The method of claim 1, wherein the flooding engine queue and the non-flooding engine queue are physically separate.

3. The method of claim 1, wherein the flooding engine queue and the non-flooding engine queue are logically separate.

4. The method of claim 1, wherein the one or more limit requests are associated with a FIFO buffer level.

5. The method of claim 1, wherein the one or more limit requests are associated with an average round trip latency for servicing a translation request.

6. The method of claim 1, wherein the one or more limit requests are associated with a workload completion percentage rate.

7. The method of claim 1, wherein a non-flooding engine having an unacceptable deadline miss status comprises at least one of a processing core, a display engine, a camera controller, a graphical processing unit, a modem, and software or firmware running on a programmable computing engine.

8. The method of claim 1, wherein the portable computing device comprises at least one of a mobile telephone, a personal digital assistant, a pager, a smartphone, a navigation device, and a hand-held computer with a wireless connection or link.

9. A system for dynamic control of shared memory resources within a portable computing device, the system comprising:
a memory management unit configured to:
classify each of a plurality of traffic engines as either a flooding engine or a non-flooding engine, wherein a flooding engine processes workloads that are capable of generating bursts of high bandwidths within short periods of times at low priorities in Quality of Service ("QoS") schemes relative to workloads processed by a non-flooding engine;
for each non-flooding engine, identify those having an unacceptable deadline miss status, wherein missing a deadline for servicing a translation request emanating from a non-flooding engine having an unacceptable deadline miss status detrimentally impacts QoS;
queue translation requests from flooding engines in a flooding engine queue and translation requests from non-flooding engines in a non-flooding engine queue, wherein the flooding engine queue and the non-flooding engine queue are separate;
process address translation requests from flooding engines and address translation requests from non-flooding engines according to a default memory resource arbitration policy;
receive one or more limit requests from one or more of the non-flooding engines having an unacceptable deadline status; and
based on the one or more limit requests, modify the default memory address translation resource arbitration policy such that there is an increase in allocation of memory address translation resources to translation requests in the non-flooding engine queue.

10. The system of claim 9, wherein the flooding engine queue and the non-flooding engine queue are physically separate.

11. The system of claim 9, wherein the flooding engine queue and the non-flooding engine queue are logically separate.

12. The system of claim 9, wherein the one or more limit requests are associated with a FIFO buffer level.

13. The system of claim 9, wherein the one or more limit requests are associated with an average round trip latency for servicing a translation request.

14. The system of claim 9, wherein the one or more limit requests are associated with a workload completion percentage rate.

15. The system of claim 9, wherein a non-flooding engine having an unacceptable deadline miss status comprises at least one of a processing core, a display engine, a camera controller, a graphical processing unit, a modem, and software or firmware running on a programmable computing engine.

16. The system of claim 9, wherein the portable computing device comprises at least one of a mobile telephone, a personal digital assistant, a pager, a smartphone, a navigation device, and a hand-held computer with a wireless connection or link.

17. A system for dynamic control of shared memory resources within a portable computing device, the system comprising:
   means for classifying each of a plurality of traffic engines as either a flooding engine or a non-flooding engine, wherein a flooding engine processes workloads that are capable of generating bursts of high bandwidths within short periods of times at low priorities in Quality of Service ("QoS") schemes relative to workloads processed by a non-flooding engine;
   for each non-flooding engine, means for identifying those having an unacceptable deadline miss status, wherein missing a deadline for servicing a translation request emanating from a non-flooding engine having an unacceptable deadline miss status detrimentally impacts QoS;
   means for queuing translation requests from flooding engines in a flooding engine queue and translation requests from non-flooding engines in a non-flooding engine queue, wherein the flooding engine queue and the non-flooding engine queue are separate;
   means for processing translation requests from flooding engines and translation requests from non-flooding engines according to a default memory resource arbitration policy;
   means for receiving one or more limit requests from one or more of the non-flooding engines having an unacceptable deadline status; and
   means for, based on the one or more limit requests, modifying the default memory address translation resource arbitration policy such that there is an increase in allocation of memory address translation resources to translation requests in the non-flooding engine queue.

18. The system of claim 17, wherein the flooding engine queue and the non-flooding engine queue are physically separate.

19. The system of claim 17, wherein the flooding engine queue and the non-flooding engine queue are logically separate.

20. The system of claim 17, wherein the one or more limit requests are associated with a FIFO buffer level.

21. The system of claim 17, wherein the one or more limit requests are associated with an average round trip latency for servicing a translation request.

22. The system of claim 17, wherein the one or more limit requests are associated with a workload completion percentage rate.

23. The system of claim 17, wherein a non-flooding engine having an unacceptable deadline miss status comprises at least one of a processing core, a display engine, a camera controller, a graphical processing unit, a modem, and software or firmware running on a programmable computing engine.

24. A computer program product comprising a non-transitory computer usable medium having a computer readable program code embodied therein, said computer readable program code adapted to be executed to implement a method for dynamic control of shared memory resources within a portable computing device, said method comprising:
   classifying each of a plurality of traffic engines as either a flooding engine or a non-flooding engine, wherein a flooding engine processes workloads that are capable of generating bursts of high bandwidths within short periods of times at low priorities in Quality of Service ("QoS") schemes relative to workloads processed by a non-flooding engine;
   for each non-flooding engine, identifying those having an unacceptable deadline miss status, wherein missing a deadline for servicing a translation request emanating from a non-flooding engine having an unacceptable deadline miss status detrimentally impacts QoS;
   queuing translation requests from flooding engines in a flooding engine queue and translation requests from non-flooding engines in a non-flooding engine queue, wherein the flooding engine queue and the non-flooding engine queue are separate;
   processing translation requests from flooding engines and translation requests from non-flooding engines according to a default memory resource arbitration policy;
   receiving one or more limit requests from one or more of the non-flooding engines having an unacceptable deadline status; and
   based on the one or more limit requests, modifying the default memory address translation resource arbitration policy such that there is an increase in allocation of memory address translation resources to translation requests in the non-flooding engine queue.

25. The computer program product of claim 24, wherein the flooding engine queue and the non-flooding engine queue are physically separate.

26. The computer program product of claim 24, wherein the flooding engine queue and the non-flooding engine queue are logically separate.

27. The computer program product of claim 24, wherein the one or more limit requests are associated with a FIFO buffer level.

28. The computer program product of claim 24, wherein the one or more limit requests are associated with an average round trip latency for servicing a translation request.

29. The computer program product of claim 24, wherein the one or more limit requests are associated with a workload completion percentage rate.

30. The computer program product of claim 24, wherein a non-flooding engine having an unacceptable deadline miss status comprises at least one of a processing core, a display engine, a camera controller, a graphical processing unit, a modem, and software or firmware running on a programmable computing engine.

* * * * *